(12) United States Patent
Saylock

(10) Patent No.: US 9,693,572 B2
(45) Date of Patent: Jul. 4, 2017

(54) FLAKED FISH ANALOGS AND METHODS FOR MAKING SUCH ANALOGS

(75) Inventor: Michael John Saylock, Kansas City, MO (US)

(73) Assignee: NESTEC SA, Vevey (CH)

( * ) Notice: Subject to any disclaimer, the term of this patent is extended or adjusted under 35 U.S.C. 154(b) by 368 days.

(21) Appl. No.: 13/138,911

(22) PCT Filed: Apr. 14, 2010

(86) PCT No.: PCT/US2010/001111
§ 371 (c)(1),
(2), (4) Date: Oct. 21, 2011

(87) PCT Pub. No.: WO2010/126563
PCT Pub. Date: Nov. 4, 2010

(65) Prior Publication Data
US 2012/0040059 A1    Feb. 16, 2012

Related U.S. Application Data

(60) Provisional application No. 61/214,698, filed on Apr. 27, 2009.

(51) Int. Cl.
| | |
|---|---|
| A23K 1/10 | (2006.01) |
| A23J 1/04 | (2006.01) |
| A23L 1/317 | (2006.01) |
| A23J 1/12 | (2006.01) |
| A23K 1/00 | (2006.01) |
| A23J 1/08 | (2006.01) |
| A23J 1/20 | (2006.01) |
| A23J 1/14 | (2006.01) |
| A23J 1/02 | (2006.01) |

(Continued)

(52) U.S. Cl.
CPC .............. *A23J 3/227* (2013.01); *A23L 17/70* (2016.08)

(58) Field of Classification Search
USPC .................. 426/92, 574, 641, 643, 644, 657
See application file for complete search history.

(56) References Cited

U.S. PATENT DOCUMENTS

| | | | |
|---|---|---|---|
| 4,132,809 A | | 1/1979 | Desrosier |
| 4,579,741 A | * | 4/1986 | Hanson ................ A23L 1/3255 426/104 |

(Continued)

FOREIGN PATENT DOCUMENTS

| | | |
|---|---|---|
| EP | 0265740 | 5/1988 |
| JP | 5540076 | 7/2014 |

(Continued)

OTHER PUBLICATIONS

"LaoCook," https://laocook.com/2009/04/22/spineless-invertebrate-mackerel/ (Apr. 22, 2009) pp. 1-7.*

(Continued)

*Primary Examiner* — Nikki H Dees
*Assistant Examiner* — Amber Cox

(57) ABSTRACT

The invention provides flaked fish analogs comprising from about from about 18 to about 25% protein, from about 3 to about 9% fat, and from about 60 to about 85% moisture. The compositions have a realistic fish-like appearance and texture, mostly due to the presence of "flakes" that mimic the flakes of real fish.

15 Claims, 6 Drawing Sheets

(51) Int. Cl.
*A23L 1/325* (2006.01)
*A23J 3/22* (2006.01)
*A23L 17/00* (2016.01)

(56) References Cited

U.S. PATENT DOCUMENTS

| | | | |
|---|---|---|---|
| 4,781,939 | A | 11/1988 | Martin |
| 5,188,854 | A | 2/1993 | Hartman |
| 5,254,352 | A | 10/1993 | Hartman |
| 5,792,504 | A | 8/1998 | Poppel et al. |
| 5,939,129 | A | 8/1999 | Kawano |
| 6,146,684 | A | 11/2000 | Kawano |
| 6,228,172 | B1* | 5/2001 | Taylor ............. A23G 3/26 118/19 |
| 6,379,738 | B1 | 4/2002 | Dingman |
| 6,736,053 | B1 | 5/2004 | Yasuno |
| 6,908,634 | B2 | 6/2005 | Hwang |
| 2005/0008758 | A1 | 1/2005 | Howse |
| 2007/0148323 | A1* | 6/2007 | Dingman ......... A23L 1/31436 426/646 |
| 2008/0122133 | A1* | 5/2008 | Zheng ............. A23K 50/40 264/102 |
| 2008/0254167 | A1* | 10/2008 | McMindes ......... A23J 3/16 426/72 |
| 2008/0254367 | A1 | 10/2008 | Hamamoto |
| 2008/0268103 | A1 | 10/2008 | Derks |
| 2009/0068336 | A1 | 3/2009 | Torney |

FOREIGN PATENT DOCUMENTS

| | | |
|---|---|---|
| WO | 2004016097 | 2/2004 |
| WO | 2004045301 | 6/2004 |
| WO | 2007090916 | 8/2007 |
| WO | 2008034063 | 3/2008 |
| WO | 2008124629 | 10/2008 |

OTHER PUBLICATIONS

"Ideas in Food," http://blog.ideasinfood.com/ideas_in_food/2006/06/a_piscine_dilem.html (Jun. 2006) pp. 1-3.*
European Search Report for Application No. 10770041.1 dated Nov. 24, 2015—9 pages.
European Communication for Application No. 10770041.1 dated Dec. 11, 2015—1 page.
International Search report and Written Opinion to PCT/US10/01111 dated Jun. 16, 2010.

* cited by examiner

FLAKED FISH ANALOGS AND METHODS FOR MAKING SUCH ANALOGS

CROSS REFERENCE TO RELATED APPLICATIONS

This application is a national stage application under 35 U.S.C. §371 of PCT/US2010/001111 filed Apr. 14, 2010, which claims priority to U.S. Provisional Application Ser. No. 61/214,698 filed Apr. 27, 2009, the disclosures of which are incorporated herein by this reference.

BACKGROUND OF THE INVENTION

Field of the Invention

The invention relates generally to food analogs and particularly to fish analogs having a realistic flaked fish-like appearance and texture and methods for making such analogs.

Description of Related Art

Methods for making food analogs are known in the food industry. Typically, to reduce the cost of certain food products, often by replacing all or a portion of real meat with meat substitutes, there has been a demand for meat analogs that resemble chunks or pieces of real meat in appearance, texture, and physical structure. Such products are used as a partial or complete replacement for more expensive real meat chunks in food products such as stews, pot pies, casseroles, canned foods, and pet foods. Chunky meat products are highly desirable in human and pet foods, both for aesthetic quality and consumer appeal. These chunky products provide a more economical product that attempts to simulate real meat chunks in shape, appearance, and texture.

Early efforts to develop meat analogs include producing such analogs from vegetable protein and/or meat sources using extrusion-expansion techniques or other conventional means. These products are in the form of a uniform, homogeneous mass, but lack the structure, texture, and appearance of real meat chunks. Therefore, these products are not suitable for use in applications in which the use of simulated meat chunks is desired. Later efforts were somewhat more successful. An improvement in meat analogs is disclosed in U.S. Pat. No. 4,781,939. This patent discloses processing a meat emulsion under conditions that produce a layered, non-expanded product in the form of chunks or pieces that simulate real meat chunks in texture, appearance, and consistency. The product is in the form of distinct chunks or pieces having a plurality of juxtaposed, manually separable meat-like layers resembling a fibrous chunk of real meat in appearance, texture, and consistency. A further improvement in meat analog fibrous appearance and texture is described in U.S. Pat. No. 6,379,738. The meat emulsion chunks are suitable for use as a partial or complete replacement for more expensive natural meat chunks in both human and animal foods. They retain their integrity and shape when subjected to commercial canning and sterilization procedures such as those required in the production of canned, high moisture food products, including pet food products. However, while these methods produced somewhat acceptable meat analogs that had the fibrous appearance of pork, beef, and the like, the methods failed to provide fish analogs with an acceptable appearance and texture that mimicked real fish.

Attempts to produce fish analogs are described in WO2008034063. The patent application discloses a fish analog comprising a mixture of fibrous plant protein and real fish meat. The fibrous texture of the plant protein component is not characteristic of fish and thus not an acceptable simulation of real fish meat. An acceptable simulated fish product when cooked should be easily separated into layers or flakes that are not interconnected by fibrous strands and should have a short, soft and non-elastic bite. Other fish and meat analogs and methods for making such analogs are known in the art. For example, U.S. Pat. No. 5,188,854 discloses a process for producing a seafood analog product comprising the steps of mixing chunks of a natural fish and a binder to coat the surfaces of the chunks with the binder, forming the coated chunks into a desired shape, subjecting the formed, binder-coated chunks to an elevated temperature to raise the internal temperature of the chunks to a predetermined level sufficient to cook the chunks and set the binder, and subjecting the formed and cooked binder coated chunks to pasteurization. U.S. Pat. No. 5,254,352 discloses a fish fillet or fish steak analog containing fish chunks having a gelled surimi paste between adjacent chunks and substantially covering the surfaces of the chunks. U.S. Pat. No. 5,939,129 and U.S. Pat. No. 6,146,684 disclose processes for producing ground fish meat products or their analogues, which uses, as the main raw material, non-salt ground fish meat along with a gel of glucomannan hydrate, or a gel of glucomannan hydrate only. U.S. Pat. No. 6,736,053 discloses an apparatus for automatically producing a paste food product resembling in appearance a crab's leg meat that causes a sensation of a crab's leg meat upon eating. U.S. Pat. No. 6,908,634 discloses transglutaminase-coupled vegetable protein compositions and processes for preparing the compositions, particularly soy fish and meat products and their analogs. US2005008758A1 discloses methods for preparing meat analogues by (a) hydrating a textured vegetable protein to form a hydrated textured vegetable protein; (b) preparing a protein base containing vital wheat gluten, milk-derived protein, and water; and (c) combining the hydrated textured vegetable protein and the protein base. WO04016097A1 discloses a method of manufacturing a texturised proteinaceous meat analogue having a relative water activity of less than about 0.8, comprising proteinaceous materials selected from the group consisting of defatted soy flour, soy meal, soy concentrate, cereal gluten (in vital or starch containing form) and egg white powder, edible binding and cross-linking compounds, and a humectant of glycerol and glucose, and the products thereof. WO04045301A1 discloses a proteinaceous meat analogue consisting of particles of internally texturised, proteinaceous extrudate material dispersed in a gelled matrix composed of ground meat-based and cereal-based materials; wherein the moisture content of said extrudate and said matrix are different; and wherein the internal texturisation of said extrudate has a fibrous structure. WO2007090916A1 discloses a method for forming myotomes or myosepta in restructured fish products consisting of joining sheets based on surimi or minced fish using an adhesive mixture comprising an aqueous dispersion or a powder mixture containing a binder or an adhesive which uses covalent bonds to join a thermoreversible binder and a white color enhancer.

Unfortunately, known methods for producing fish analogs result in products that do not have a realistic fish-like appearance or texture, mainly due to a fibrous appearance. There is, therefore a need for new fish analogs and methods for making fish analogs that have a realistic fish-like appearance and texture.

SUMMARY OF THE INVENTION

It is, therefore, an object of the present invention to provide flaked fish analogs that have a realistic fish-like appearance.

It is another object of the invention to provide flaked fish analogs that have a realistic fish-like texture.

It is another object of the invention to provide methods for making flaked fish analogs that have a realistic fish-like appearance and texture.

It is a further object of the invention to provide packages suitable for containing flaked fish analogs and for displaying the appearance and texture of the analogs.

One or more of these or other objects are achieved using novel flaked fish analogs comprising from about 18 to about 25% protein, from about 3 to about 9% fat, and from about 60 to about 85% moisture. The flaked fish analogs are made by creating a homogeneous dough mixture of proteins, fats, and water; emulsifying the dough mixture at temperatures to from about 130 to about 160° C. and pressures of from about 60 to about 100 psi; and cooling the emulsion to a temperature to from about 15 to about 40° C. and reducing the pressure to atmospheric pressure. The flaked fish analogs are packaged in a package that has a transparent window that permits the consumer to view the analog and observe its realistic fish-like appearance.

Other and further objects, features, and advantages of the present invention will be readily apparent to those skilled in the art.

DETAILED DESCRIPTION OF THE INVENTION

Definitions

Figure 1:
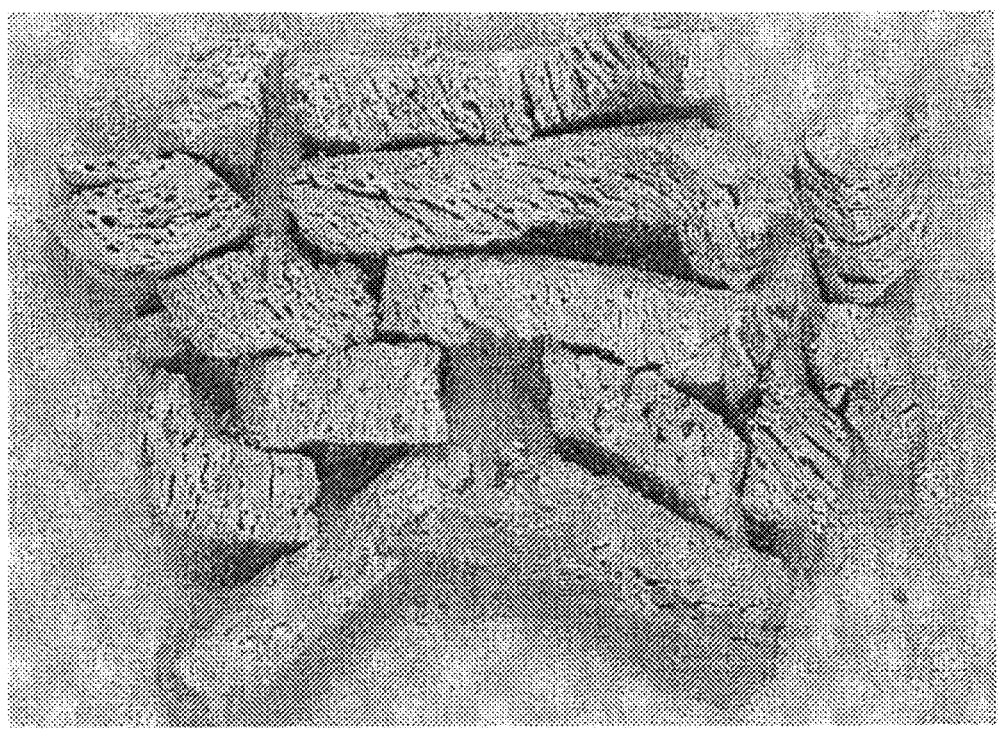
FIG. 1 is photograph of a prior art meat analog.

The term "fish analog" means a manufactured food composition designed to imitate real fish.

The term "animal" means any animal that could benefit from or enjoy the consumption of the fish analogs of the present invention, including various human, avian, bovine, canine, equine, feline, murine, ovine, or porcine animals.

The term "companion animal" means domesticated animals such as birds, cats, dogs, ferrets, hamsters, mice, gerbils, horses, cows, goats, sheep, donkeys, pigs, and the like.

All percentages expressed herein are by weight of the total weight of the composition unless expressed otherwise.

All ratios expressed herein are on a weight:weight (w/w) basis unless expressed otherwise.

As used herein, ranges are used herein in shorthand, so as to avoid having to list and describe each and every value within the range. Any appropriate value within the range can be selected, where appropriate, as the upper value, lower value, or the terminus of the range.

As used herein, the singular form of a word includes the plural, and vice versa, unless the context clearly dictates otherwise. Thus, the references "a", "an", and "the" are generally inclusive of the plurals of the respective terms. For example, reference to "an analog", "a method", or "a food" includes a plurality of such "analogs", "methods", or "foods." Similarly, the words "comprise", "comprises", and "comprising" are to be interpreted inclusively rather than exclusively. Likewise the terms "include", "including" and "or" should all be construed to be inclusive, unless such a construction is clearly prohibited from the context. Similarly, the term "examples," particularly when followed by a listing of terms, is merely exemplary and illustrative and should not be deemed to be exclusive or comprehensive.

The methods and compositions and other advances disclosed here are not limited to particular methodology, protocols, and reagents described herein because, as the skilled artisan will appreciate, they may vary. Further, the terminology used herein is for the purpose of describing particular embodiments only, and is not intended to, and does not, limit the scope of that which is disclosed or claimed.

Unless defined otherwise, all technical and scientific terms, terms of art, and acronyms used herein have the meanings commonly understood by one of ordinary skill in the art in the field(s) of the invention, or in the field(s) where the term is used. Although any compositions, methods, articles of manufacture, or other means or materials similar or equivalent to those described herein can be used in the practice of the present invention, the preferred compositions, methods, articles of manufacture, or other means or materials are described herein.

All patents, patent applications, publications, technical and/or scholarly articles, and other references cited or referred to herein are in their entirety incorporated herein by reference to the extent allowed by law. The discussion of those references is intended merely to summarize the assertions made therein. No admission is made that any such patents, patent applications, publications or references, or any portion thereof, are relevant, material, or prior art. The right to challenge the accuracy and pertinence of any assertion of such patents, patent applications, publications, and other references as relevant, material, or prior art is specifically reserved.

The Invention

In one aspect, the invention provides flaked fish analogs. The analogs comprise from about 18 to about 25% protein, from about 3 to about 9% fat, and from about 60 to about 85% moisture. The flaked fish analogs have a realistic fish-like appearance and texture due to the presence of "flakes" that mimic the flakes of real fish. Known meat analogs, including known fish analogs, have a more fibrous appearance due to different amounts of one or more of protein, fat, and moisture in the composition as compared to the present invention. Such known fish analogs have at least 25% protein and from 50 to 60% moisture. Analogs with these known amounts of protein and moisture have a fibrous appearance that may be desirable for typical non-fish meat analogs but are not desirable for fish analogs. Fish analogs made using known ranges of ingredients do not have a pleasing or realistic fish-like appearance. In contrast, the present invention avoids the fibrous appearance and provides a composition that looks like real fish, i.e., flakes of real fish.

In various embodiments, the flaked fish analogs comprise from about 18 to about 25% protein, preferably from about 19 to about 24%, most preferably from about 20 to about 24%; from about 3 to about 9% fat, preferably from about 4 to about 8%, most preferably from about 5 to about 7%;

and from about 60 to about 85% moisture, preferably from about 60 to about 70%, most preferably from about 62 to about 68%.

The protein is any suitable protein useful to produce the flaked fish analogs. Preferably, the protein is fish protein, soy protein, soy protein concentrate, soy flour, milk protein, whey protein, plasma protein, egg protein, wheat protein, pea protein, or combinations thereof. Preferably, the protein is fish protein or combinations thereof with other suitable proteins. Most preferably, the protein is fish protein.

Sources of fish protein include, but are not limited to, white fish, white or light colored fish loins or filets, minced fish, fish paste, whole sources of ocean whitefish, fish heads, racks & tails, and the like.

In various embodiments, these fish proteins can be combined with other white or light colored meats such as chicken, turkey, pork, rabbit, and the like, or combinations thereof, to develop a protein mix useful to produce the flaked fish analogs. The amount of a particular protein source will vary depending on the protein source. Selection of such meats and amounts is within the scope of a skilled artisan. For example, the protein used to make the flaked fish analogs can be a mixture of from about 30 to about 70% fish protein and from about 70 to about 30% chicken protein, preferably about 50% of each. In one embodiment, the protein used to make the flaked fish analogs can be a mixture of from about 30 to about 70% fish protein and from about 70 to about 30% turkey protein, preferably about 50% of each. In another, the protein used to make the flaked fish analogs can be a mixture of from about 40 to about 60% fish protein and from about 60 to about 40% pork protein, preferably about 50% of each.

The fat is any suitable fat or oil useful to produce the flaked fish analogs. Preferably, the fat is any non-hydrogenated fat or oil of animal or vegetable origin. In various embodiments, the fat is one or more saturated fats, e.g., saturated fats obtained from dairy products such as cream, cheese, butter, and ghee; animal fats such as suet, tallow, lard, and fatty meat; coconut oil; cottonseed oil; palm oil; and fish oil. In various embodiments, the fats are monounsaturated fats, polyunsaturated fats, or combinations thereof. In a preferred embodiment, the fat is fish oil.

The moisture is moisture that is inherent in the ingredients or that is added to achieve the desired moisture content. Generally, when needed, water is added to achieve the desired moisture content.

In certain embodiments, the flaked fish analogs further comprise colorants that modify the color of the analogs. In some embodiments, the colorants alter the color of the analogs by making the analogs lighter in color, particularly mimicking the white color of many real fish meats or surimi. In others, the colorants alter the color of the analogs by making the analogs mimic the color of a particular fish meat, e.g., salmon (pink) or tuna (redish). Colorants include, but are not limited to, compounds such as titanium dioxide or iron oxides; natural colorants such as annatto, cochineal, paprika, turmeric and carotenoids; colorants approved by the Federal Food, Drug & Cosmetic (FD&C) Act (FD&CColorants) for use in food products; or combinations thereof. The amount for a particular colorant will vary depending on the colorant selected. Selection of such amounts is within the scope of a skilled artisan. Typically, the colorants are added in amounts of about 0.05 to about 5% of the composition, preferably from about 0.1 to about 3%, most preferably from about 0.5 to about 2%. In one embodiment, titanium dioxide is added in amounts of from 0.1 to about 2%, preferably from about 0.5 to about 1%.

In some embodiments, the flaked fish analogs further comprise from about 2 to about 20% fish skin, preferably from about 4 to about 16%, most preferably from about 6 to about 12%. The fish skin is added to the analogs to further mimic the appearance of real fish. Preferably, the fish skin is added to the flaked fish analogs using methods that coat the fish skin on the surface of the flaked fish analogs. In one embodiment, the flaked fish analogs comprise from about 18 to about 25% protein, from about 3 to about 9% fat, from about 2 to about 20% fish skin, and from about 60 to about 85% moisture. In another, the flaked fish analogs comprise from about 18 to about 25% protein, from about 3 to about 9% fat, from about 4 to about 16% fish skin, and from about 60 to about 85% moisture, preferably from about 60 to about 70%, most preferably from about 62 to about 68%.

The fish skin is any suitable fish skin useful to produce the flaked fish analogs. In various embodiments, the fish skin is from freshwater fish, migratory fish, saltwater fish, or combinations thereof. Preferably, the fish skin is whitefish skin, catfish skin, cod skin, pollock skin, haddock skin, walleye pike skin, trout skin, or combinations thereof.

The moisture in the flaked fish analogs varies from about 60 to about 85% depending on the amount of protein, fat, and optional fish skin in the analogs. Generally, when the fish analogs do not have fish skin the moisture content varies from about 60 to about 70%, most preferably from about 62 to about 68%. When the fish analogs have added fish skin, the moisture content is slightly higher and varies from about 65 to about 85%, most preferably from about 68 to about 82%.

In various embodiments, the flaked fish analogs comprise additional ingredients such as vitamins, minerals, amino acids, nucleic acids, fillers, palatability enhancers, binding agents, flavors, stabilizers, emulsifiers, sweeteners, colorants, buffers, salts, coatings, condiments, preservatives, prebiotics, probiotics, drugs, medicaments, medications, and the like known to skilled artisans. Non-limiting examples of supplementary minerals include calcium, phosphorous, potassium, sodium, iron, chloride, boron, copper, zinc, magnesium, manganese, iodine, selenium, and the like. Non-limiting examples of supplementary vitamins include vitamin A, any of the B vitamins, vitamin C, vitamin D, vitamin E, and vitamin K, including various salts, esters, or other derivatives of the foregoing. Additional dietary supplements may also be included, for example, any form of niacin, pantothenic acid, inulin, folic acid, biotin, amino acids, and the like, as well as salts and derivatives thereof. Stabilizers include substances that tend to increase the shelf life of the composition such as preservatives, synergists and sequestrants, packaging gases, emulsifiers, thickeners, gelling agents, and humectants. Examples of emulsifiers and/or thickening agents include gelatin, cellulose ethers, starch, starch esters, starch ethers, and modified starches. Selection of the ingredients and their amounts is known to skilled artisans. Specific amounts for each additional ingredient will depend on a variety of factors such as the ingredient included in the composition; the species of animal; the animal's age, body weight, general health, sex, and diet; the animal's consumption rate; the purpose for which the food composition is being administered to the animal; and the like. Therefore, the component and ingredient amounts may vary widely and may deviate from the preferred proportions described herein.

In other embodiments, the flaked fish analogs are formulated to provide "complete and balanced" nutrition for an animal, preferably a companion animal, according to standards established by the Association of American Feed Control Officials (AAFCO). In still other embodiments, the flaked fish analogs are formulated as a snack, treat, toy, chew, or similar composition. In preferred embodiments, the flaked fish analogs are formulated for felines, particularly as a complete and balanced food.

Referring to the Figures, FIG. 1 illustrates a prior art meat analog, e.g. EP1231846B1, U.S. Pat. No. 6,379,738, and U.S. Pat. No. 6,649,206. As shown in FIG. 1, the analog has a fibrous texture and, although it has a chunky, meat-like appearance, the analog does not have a fish-like appearance and particularly does not have the flakey appearance of real fish. The fibrous analog is the product of a process wherein one or more of the protein, fat, and moisture content of the product are outside the range used to produce the flaked fish analogs of the present invention.

Figure 2:
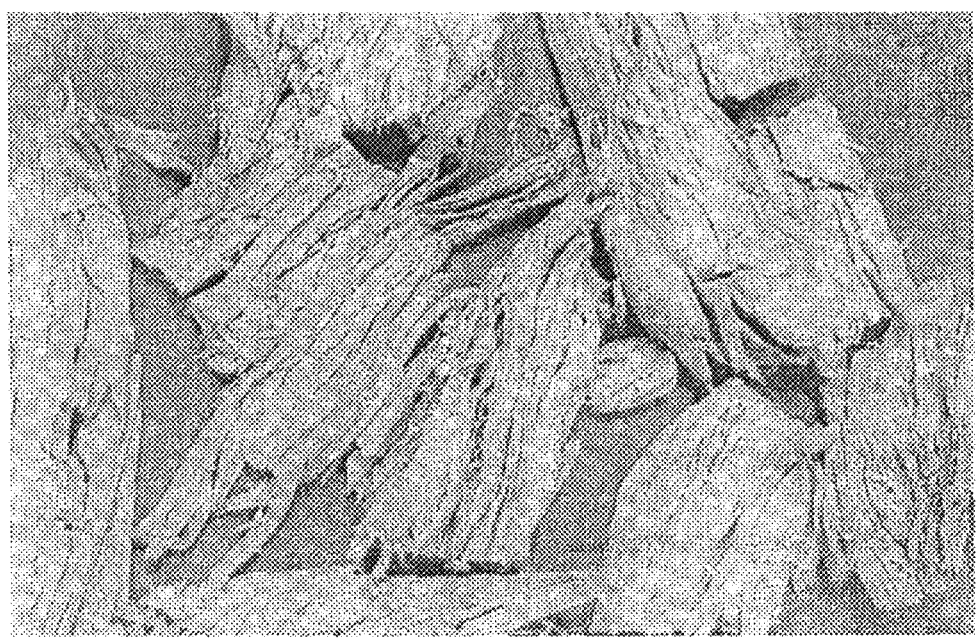
FIG. 2 is photograph of a prior art meat analog.

FIG. 2 illustrates a prior art meat analog, e.g. EP1231846B1, U.S. Pat. No. 6,379,738, and U.S. Pat. No. 6,649,206. As shown, the analog has a fibrous, stringy texture and, although it has a stringy, meat-like appearance, the analog does not have a fish-like appearance and particularly does not have the flakey appearance of real fish. The fibrous, stringy analog is the product of a process wherein one or more of the protein, fat, and moisture content of the product are outside the range used to produce the flaked fish analogs of the present invention.

Figure 3:
FIG. 3 is photograph of a flaked fish analog of the present invention without skin.

FIG. 3 illustrates the flaked fish analogs of the present invention without fish skin. As shown, the analogs have a realistic fish-like appearance and texture, particularly a flaked fish-like appearance and texture. The compositions essentially have the appearance of real fish, including the flake characteristics of real fish.

Figure 4:
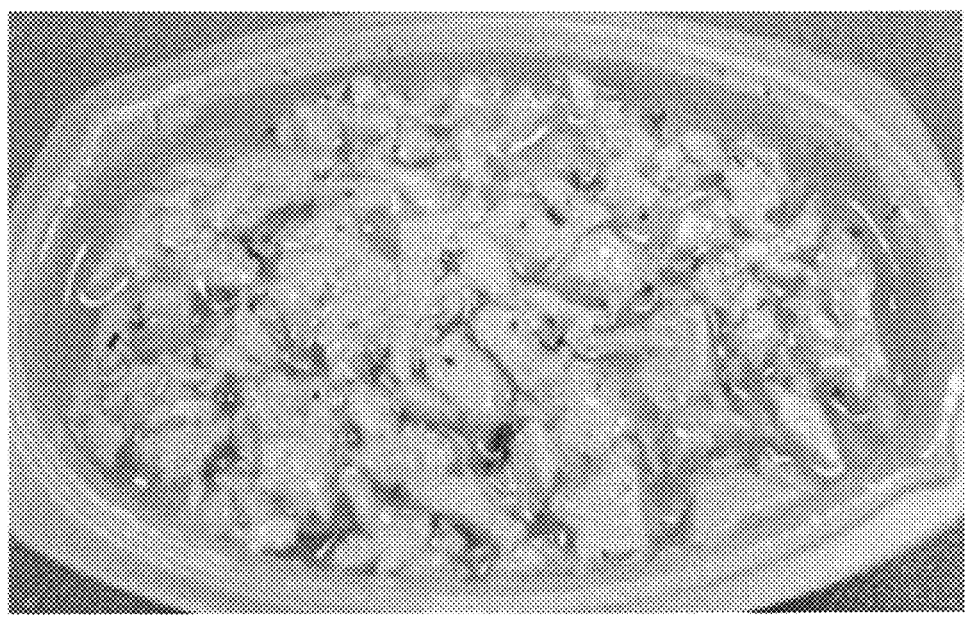
FIG. 4 is photograph of a flaked fish analog of the present invention with skin.

FIG. 4 illustrates the flaked fish analogs of the present invention with fish skin. As shown, the analogs have a realistic fish-like appearance and texture, particularly a flaked fish-like appearance and texture. The compositions essentially have the appearance of real fish, including the flake characteristics of real fish and the appearance of real fish with fish skin.

Figure 5:
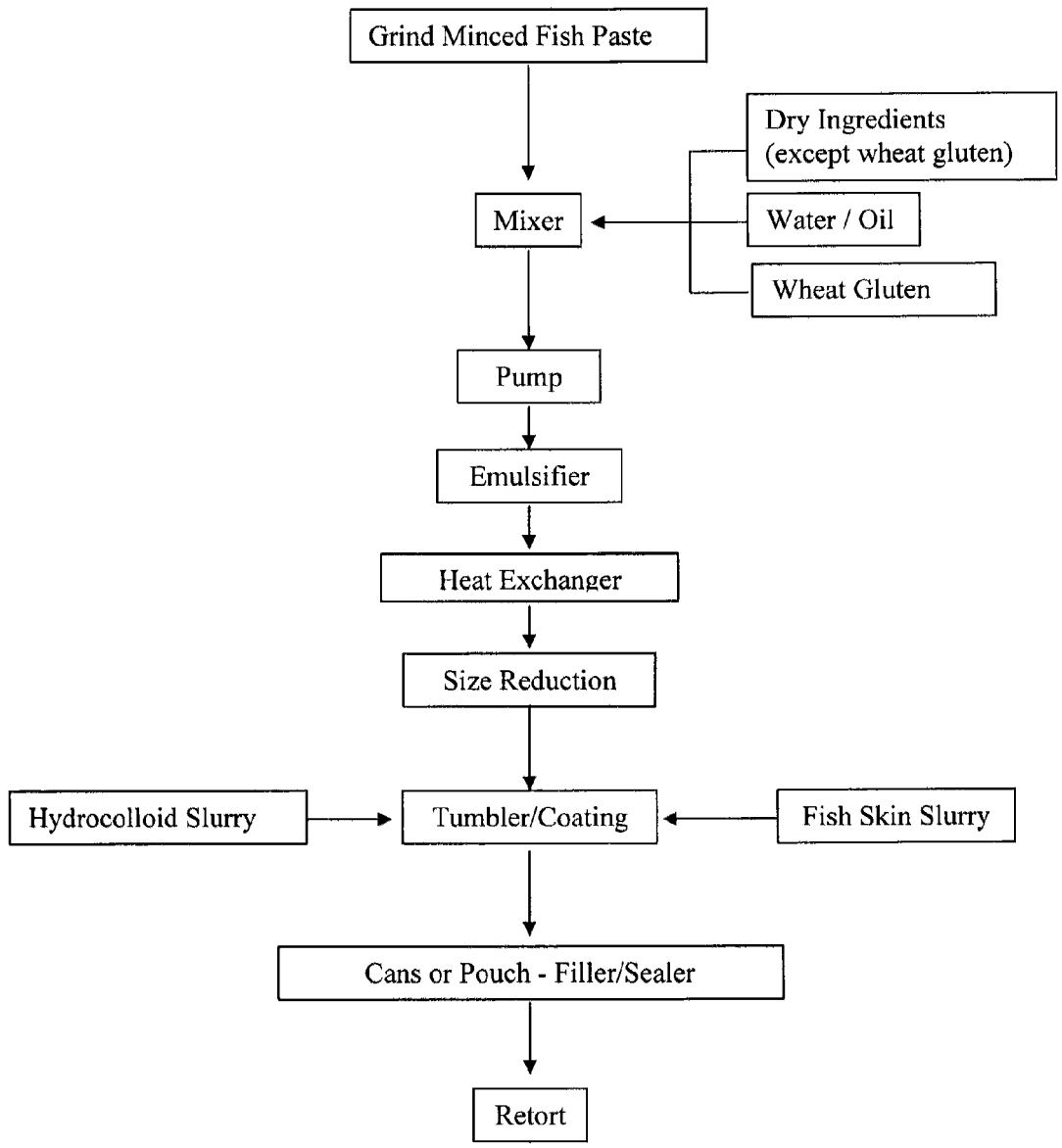
FIG. 5 is a schematic of a process for manufacturing a flaked fish analog in an embodiment of the invention.

FIG. 5 is a schematic showing a process for producing flaked fish analogs. In one embodiment of the process, frozen white fish surimi or paste is size reduced with an extructor and grinder with plate openings of 6.35 mm in diameter and fed to a paddle mixer via an emulsifier. The temperature is raised to 35° C. by direct steam injection to enable proper mixing. Minor dry ingredients such as supplemental binding functional animal or vegetable protein or both, vitamins, minerals, and fibers are added to the mixer followed by the liquid ingredients such as water, oil, and colors. After mixing to obtain a smooth slurry, wheat gluten is added to the slurry in the mixer and mixed until a uniform dough is formed. The moisture of the dough is determined with a microwave heating analyzer. The target range is from about 58 to about 68% and is most preferably in the range of from about 63 to about 66%. The dough is then pumped to a continuous emulsifier. In addition to being emulsified, the pressure on and the temperature of the mass is increased. The temperature fluctuates in a range of from about 137 to about 160° C., preferably from about 148 to about 154° C. The pressure ranges from about 60 to about 100 psi, preferably from about 70 to about 90 psi. The pressurized meat emulsion is then fed into a heat exchanger with jacketed cooling water (about 5 to 32° C.), preferably one that flows in a counter current direction. The set emulsion product that exits the heat exchanger is then cut and diced into suitably sized fish "flakes." The moisture content of the flakes at this point is from about 45 to about 65%, preferably from about 50 to about 60%. The resulting composition has the appearance of flaked fish, e.g., the flaked fish analog shown in FIG. 3. The composition can be stored for use in various products requiring a flaked fish analog that looks like a real fish filet.

In another preferred embodiment, a whole flaked fish analog is prepared by making a hydrocolloid and minced fish skin slurry and using the slurry to coat the flaked fish analog. To prepare the minced fish skin slurry, frozen or fresh fish skin is ground to produce skin pieces having a size of about 1 to 4 mm on the longest side(s). A uniform hydrocolloid dispersion is prepared by adding a hydrocolloid gum or starch to excess water in a high speed gum dispersing system. The gum dispersion and the minced fish skin are then combined in a cooker-mixer and mixed to form uniform suspension of skin pieces. The flaked fish analog is added to a tumbler/coater and the fish skin slurry is poured onto the analog with continuous tumbling until the skin randomly adheres to the surface of the analog. The resulting composition had the appearance of whole flaked fish, e.g., the flaked fish analog shown in FIG. 4.

Figure 6:
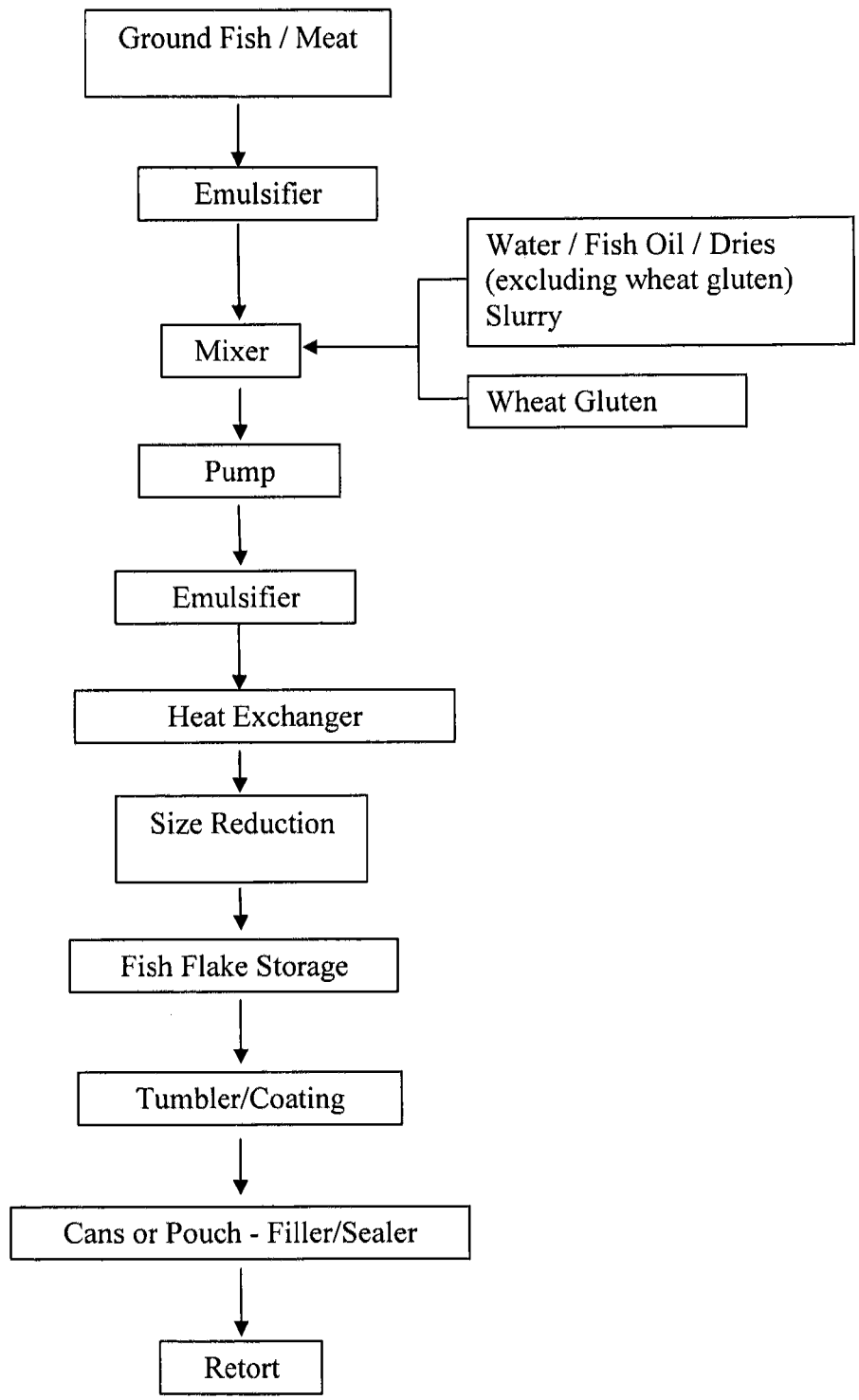
FIG. 6 is a schematic of a process for manufacturing a flaked fish analog in another embodiment of the invention.

FIG. 6 is a schematic showing a process for producing flaked fish analogs in another embodiment of the invention. This process utilizes fish parts such as scrapfish, racks and tails, or fish heads that have less binding functionality compared to surimi, fish paste, or whole fish. To ensure good texturization or binding, the analogs are supplemented with functional animal muscle protein, vegetable protein, or both. Also in this process, dry supplemental proteins and other dry ingredients are hydrated in a high shear dispersing system before being added to the meat/fish emulsion in the mixer. The remainder of the process and process control parameters are the same as or similar to those described for the process disclosed in FIG. 2.

In another aspect, the invention provides methods for making flaked fish analogs. The methods comprise creating a homogeneous dough mixture of (1) one or more proteins in amounts sufficient to produce a final fish analog containing from about 18 to about 25% protein, preferably from about 19 to about 24%, most preferably from about 20 to about 24%; (2) one or more fats in amounts sufficient to produce a final fish analog containing from about 3 to about 9% fat, preferably from about 5 to about 7%, most preferably from about 4 to about 6%; and (3) water in amounts sufficient to produce a final fish analog containing from about 60 to about 85% moisture; emulsifying the dough mixture while increasing the temperature to from about 135 to about 160° C., preferably from about 140 to about 150°, most preferably from about 143 to about 149° C., and the pressure to from about 60 to about 100 psi, preferably from about 65 to about 95 psi, most preferably from about 70 to about 90 psi; and cooling the emulsion to a temperature to from about 15 to about 40° C. and reducing the pressure to about atmospheric pressure. The methods produce fish analogs that have a realistic fish-like appearance and texture. In particular, the analogs have the appearance of flaked fish that is characteristic of real fish and do not have the fibrous appearance of known meat analogs.

In on embodiment, the emulsifying and heating steps are accomplished in a heat exchanger. The dough mixture is heated and pressurized inside the heat exchanger. The resulting fish analogs exit the heat exchanger to atmospheric pressure. The analogs are cooled or allowed to cool to the required temperature. In another embodiment, emulsifying and heating steps are accomplished in an extruder. The process conditions in the extruder increase the temperature and pressure to the required levels. If necessary or convenient, the extrusion process can be modified to accomplish the required pressure or additional heat can be added to the process using methods known by skilled artisans, e.g., increasing flow rates, hot water jackets or heating elements. Using extruders is particularly convenient because the fish analogs can exit the extruder and be processed to size or otherwise processed, e.g., packaged or combined with other food ingredients.

In one embodiment, the protein (typically a fish protein) is cut into suitable pieces (typically about 7 millimeters pieces) and heated slightly (to about 30 to about 40° C.). Then, the other ingredients required (e.g., fat) or desired (e.g., colorants) to produce the analog are added to the protein with stirring, typically for about 5 to 10 minutes. The resulting dough mixture is placed in an emulsifier where mechanical energy is used to raise temperature to about 130 to 160° C. and pressures of from about 60 to about 100 psi, preferably from about 65 to about 95, most preferably from about 70 to about 90 psi. Subsequently, the pressurized emulsion is fed to a heat exchanger where the temperature is lowered to from about 15 to about 40° C. Then, the set emulsion exits the heat exchanger where it is cut to relatively small pieces, e.g., strips having a size of about 25 mm wide and 8 mm thick, preferably about 20 mm wide and 4 mm thick. The strips can then be cut into pieces that are typical for real fish pieces, e.g., irregular pieces having a longer side of from about 2 to about 20 mm, preferably from about 4 to about 12 mm, most preferably from about 5 to about 10 mm. The resulting fish analog can be used as is or can be further treated to enhance its fish-like appearance by mimicking the appearance of fish skin on the analog.

In one embodiment, the methods for making flaked fish analogs further comprise creating a fish skin gum dispersion by mixing (1) one or more gums in amounts sufficient to comprise from about 0.02 to about 1%, preferably from about 0.05 to about 0.8%, most preferably from 0.1 to about 0.5%, of the fish skin gum dispersion; (2) water in amounts sufficient to comprise from about 90 to about 70%, preferably from about 88 to about 80%, most preferably from 86 to about 82% of the fish skin gum dispersion; and (3) fish skin in amounts sufficient to comprise from about 10 to about 30%, preferably from about 12 to about 20%, most preferably from 14 to about 18%, of the fish skin gum dispersion; and combining the fish skin gum dispersion in amounts sufficient to comprise from about 30 to about 70% of a fish analog having the appearance of fish with skin, preferably from about 60 to about 40%, most preferably about 50%, with a flaked fish analog of the present invention in amounts sufficient to comprise from about 70 to about 30% of a fish analog having the appearance of fish with skin, preferably from about 40 to about 60%, most preferably about 50%. The methods produce a flaked fish analog that has the appearance of real fish with skin.

The fish skin gum dispersion and flaked fish analog are combined using any suitable method. Preferably, the dispersion and analog are combined by mixing them in a tumbler/coater until the skin pieces adhere to the analog. Generally, this takes from about 1 to about 3 minutes.

The gums can be any gum suitable for producing fish skin gum dispersions that can be used to produce a flaked fish analog having the appearance of real fish with skin. In various embodiments, the gums are seaweed gums, plant seed gums, plant extract gums, fermentation gums, plant exudate gums, or combinations thereof. In certain embodiments, the gums are agar, alginates, carrageenan, guar, locust bean, psyllium, pectin, xanthan, arabic, or combinations thereof. In a preferred embodiment, the gum is xanthan gum.

The fish skin can be any fish skin suitable producing fish skin gum dispersions that can be used to produce a flaked fish analog having the appearance of real fish with skin. In various embodiments, the fish skin is from freshwater fish, migratory fish, saltwater fish, or combinations thereof. Preferably, the fish skin is whitefish skin, catfish skin, cod skin, pollock skin, haddock skin, walleye pike skin, trout skin, or combinations thereof.

Preferably, the fish skin is cut, chopped, minced, or otherwise treated to produce pieces of fish skin that are useful in the present process. Typically, the fish skin is minced to produce fish skin pieces having a size of from about 1 to about 10 millimeters, preferably from about 2 to about 8 millimeters, most preferably from about 2 to 4 millimeters.

In various aspects, the invention provides products made using the methods and process of the invention as described herein.

In another aspect, the invention provides packages comprising a material suitable for containing a flaked fish analog comprising from about 18 to about 25% protein, from about 3 to about 9% fat, and from about 60 to about 85% moisture and a label affixed to the package containing a word or words, picture, design, acronym, slogan, phrase, or other device, or combination thereof, that indicates that the contents of the package contains the flaked fish analog. Typically, such device comprises the words "real fish appearance" or "formulated to mimic real fish" or "fish-like product that provides complete and balanced nutrition" or "looks and feels like real fish" or "has the texture of real fish" or an equivalent expression printed on the package. Any package or packaging material suitable for containing a flaked fish analog of the present invention is useful in the invention, e.g., a bag, box, bottle, can, pouch, and the like manufactured from paper, plastic, foil, metal, and the like. In a preferred embodiment, the package contains a flaked fish analog of the present invention, preferably a flaked fish analog prepared for felines.

In various embodiments, the package further comprises a word or words, picture, design, acronym, slogan, phrase, or other device, or combination thereof, that indicates that the flaked fish analog has one or more of (1) an appealing flaked fish-like appearance, (2) an appealing flaked fish-like texture, (3) a nutrient profile that is the same as or similar to real fish, and (4) a formulation that provides "complete and balanced" nutrition for an animal.

In a preferred embodiment, the package contains a window that permits the flaked fish analog to be viewed, particularly by a person purchasing the packaged product. The package permits an observer, particularly a consumer, to view the analog and observe its appearance. The window can comprise any material that is compatible with the package and the flaked fish analog and that permits the analog to be viewed from outside the package, e.g., is transparent. Typically, the window is a transparent glass or plastic insert that is integrated into the package, e.g., hermetically molded into the package. In a preferred embodiment, the window is a clear, see-thorough section of the packaging material used to create the package.

In a further aspect, the invention provides a means for communicating information about or instructions for one or more of (1) using a flaked fish analog comprising from about 18 to about 25% protein, from about 3 to about 9% fat, and from about 60 to about 85% moisture as a substitute for real fish, particularly to provide nutrients to animals that prefer fish but do not have access to real fish (e.g., because of limited availability or cost); (2) providing information about the flaked fish analogs, particularly information about their appearance, texture, nutrient content, and the like; and (3) administering the flaked fish analogs to an animal. The means comprises a document, digital storage media, optical storage media, audio presentation, or visual display containing the information or instructions. In certain embodiments, the communication means is a displayed web site, visual display kiosk, brochure, product label, package insert, advertisement, handout, public announcement, audiotape, videotape, DVD, CD-ROM, computer readable chip, computer readable card, computer readable disk, computer memory, or combination thereof containing such information or instructions. Useful information includes one or more of (1) methods and techniques for administering the compositions and (2) contact information for animals or their caregivers to use if they have a question about the invention and its use. Useful instructions include administration amounts and frequency. The communication means is useful for instructing on the benefits of using the present invention.

EXAMPLES

The invention can be further illustrated by the following examples, although it will be understood that these examples are included merely for purposes of illustration and are not intended to limit the scope of the invention unless otherwise specifically indicated.

Example 1

A flaked fish analog was made based upon the formulation shown in Table 1. 145 kilograms (kg) of frozen white fish surimi was size reduced with a grinder with plate openings 6.35 mm diameter and fed to a paddle mixer. The temperature was brought up to 35° C. by direct steam injection to enable proper mixing. All of the ingredients for the fish meat (Table 1.) except wheat gluten were added to the surimi in the mixer in the sequence: dries, oil, and then water. This mixture was blended for 5 minutes until a homogenous mix was obtained. The wheat gluten (30 kg) was then added to the slurry which was mixed for 5 minutes until uniform dough was formed. The moisture of the dough was determined with a microwave heating analyzer. It was 64.5% and within target range. The dough was then pumped to a continuous emulsifier. In addition to being emulsified, the pressure on and the temperature of the mass increased. The temperature fluctuated in a range 148 to 154° C. and the pressure 70 to 90 psi. The pressurized emulsion was then fed into a heat exchanger with jacketed cooling water (5 to 32° C.) that flowed in a counter current direction. The set emulsion product exited the heat exchanger through knife grids in strips of approximately 20 mm wide and 4 mm thick. The strips were then diced into irregular pieces of longest sides ranging 6.35 to 9.5 mm. The resulting product had real flaked fish muscle appearance, see FIG. 3.

Example 2

A flaked fish analog having fish skin was made based upon the formulation shown in Table 1 and the flaked fish analog prepared in Example 1. A minced fish skin slurry suitable for use to make a flaked fish analog having fish skin was created as follows. To prepare 250 kg of minced fish skin slurry, 40 kg of frozen blocks of ocean whitefish skin was coarse ground through an extructor and then further size reduced to produce skin pieces 1 to 4 mm on its longest side. A uniform gum dispersion was prepared by adding 500 grams of xanthan gum slowly to 209.5 kg water in a high speed gum dispersing system. The gum dispersion and the minced fish skin were then combined in a cooker-mixer and mixed to produce a fish skin gum dispersion that has a uniform suspension of the skin pieces.

100 kg of a flaked fish analog having fish skin was made by combining 50 kg of the flaked fish analog from Example 1 with 50 kg of the fish skin gum dispersion in a tumbler/coater for about 1 to 2 minutes after which the skins adhered to the flaked fish analog. The resulting product had the appearance of real flaked fish with skin pieces, see FIG. 4.

TABLE 1

| Ingredients | Weight (kg) |
|---|---|
| A. Fish Meat | |
| White Fish Surimi | 145 |
| Wheat Gluten | 30 |
| Soy Protein Isolate | 5 |
| Fish Oil | 10 |
| Cellulose (Powdered) | 3.75 |
| Vitamins/Minerals | 3 |
| Water | 53.25 |
| Batch Total | 250 |
| B. Fish Skin Slurry | |
| Xanthan Gum | 0.5 |
| Ocean Whitefish Skin (Minced) | 40 |
| Water | 209.5 |
| Batch Total | 250 |
| A + B. Simulated Fish Composition | |
| Fish Meat | 50 |
| Fish Skin Slurry | 50 |
| Batch Total | 100 |

Example 3

A flaked fish analog was made based upon the formulation shown in Table 2. The analog was produced using the same methodology given in Example 1 with some variations to accommodate a fish source with lower structural functionality. 111.8 kg of frozen oceanwhite scrapfish and 111.8 kg of frozen mechanically deboned chicken were size reduced with an extructor and then ground through a plate with 6.35 mm diameter opening as described in Example 1. The ground fish and chicken were then pumped through a continuous emulsifier where the temperature was also brought up to 35° C. due to mechanical heating. This emulsified product was pumped into a paddle dough mixer. At the same time, a slurry of soy protein isolate (26 kg), fish oil (15.6 kg), powdered cellulose (7.8 kg), titanium dioxide (92.08 kg), dried egg white (5.2 kg), salt (5.2 kg), vitamins/minerals premix (6.24 kg), and water (171.08 kg) was made in a high speed/high shear disperser (Breddo Likwifier). The dries and liquids were blended for 5 minutes and a smooth slurry was obtained. This slurry was then added to the fish/chicken emulsion in the dough mixer and mixed for 5 minutes. The wheat gluten (57.2 kg) was then added and mixing continued for a further 5 minutes after which a homogenous dough was formed. From this point, the method used to form fish meat was the same as given in Example 1.

480 kg of fish skin slurry was produced as in Example 2 using the formula in Table 2. 100 kg of a flaked fish analog having skin was produced by adding 48 kg of the skin slurry to 52 kg of the flaked fish analog made using the procedure given in Example 1. The fish skin slurry and flaked fish analog were mixed in a tumbler/coater for about 5 minutes. The skins adhered to the flaked fish analog. The resulting composition had the appearance of real flaked fish with skin pieces.

TABLE 2

| Ingredients | Weight (kg) |
|---|---|
| A. Fish Meat | |
| Oceanwhite Scrapfish | 111.8 |
| Mechanically Deboned Chicken | 111.8 |
| Wheat Gluten | 57.2 |
| Soy Protein Isolate | 26 |
| Fish Oil | 10 |
| Cellulose (Powdered) | 7.8 |
| Titanium Dioxide | 2.08 |
| Dried Egg White | 5.2 |
| Salt | 5.2 |
| Vitamins/Minerals | 6.24 |
| Water | 171.08 |
| Batch Total | 520 |
| B. Fish Skin Slurry | |
| Xanthan Gum | 2.16 |
| Ocean Whitefish Skin (Minced) | 96 |
| Water | 381.84 |
| Batch Total | 480 |
| A + B. Simulated Fish Composition | |
| Fish Meat | 52 |
| Fish Skin Slurry | 48 |
| Batch Total | 100 |

In the specification, there have been disclosed typical preferred embodiments of the invention. Although specific terms are employed, they are used in a generic and descriptive sense only and not for purposes of limitation. The scope of the invention is set forth in the claims. Obviously many modifications and variations of the invention are possible in light of the above teachings. It is therefore to be understood that within the scope of the appended claims, the invention may be practiced otherwise than as specifically described.

What is claimed is:

1. A method for making a non-extruded fish analog having a flaky appearance or texture, the method comprising:
    creating a homogeneous dough mixture of (1) one or more proteins in an amount sufficient to produce a final fish analog containing 18% to 25% by weight protein; (2) one or more fats in an amount sufficient to produce a final fish analog containing about 3% to about 9% by weight fat; and (3) water in an amount sufficient to produce a final fish analog containing from 62% to 68% by weight moisture;
    emulsifying the dough mixture while increasing the temperature to between 135° C. and 160° C. and the pressure to between 60 psi to 100 psi without extrusion;
    cooling the emulsion to a temperature from about 15° C. to about 40° C. and reducing the pressure to about atmospheric pressure to produce the fish analog having a flaky appearance or texture;
    creating a fish skin slurry by mixing (1) one or more gums in an amount sufficient to comprise from about 0.02% to about 1% of the fish skin slurry by weight; (2) water in an amount from about 70% to about 90% of the fish skin slurry by weight; and (3) natural fish skin in an amount from about 10% to about 30% of the fish skin slurry by weight; and
    pouring the fish skin slurry onto the fish analog in a tumbler/coater to adhere the natural fish skin to the surfaces of the fish analog as a coating such that the fish analog has the appearance of real fish with fish skin.

2. The method of claim 1, wherein the fish skin slurry is about 30% to about 70% by weight of the combination of the fish analog and the fish skin slurry.

3. The method of claim 1 wherein the one or more gums are selected from the group consisting of seaweed gums, plant seed gums, plant extract gums, fermentation gums, plant exudate gums, and combinations thereof.

4. The method of claim 1 wherein the one or more gums are selected from the group consisting of agar, alginates, carrageenan, guar, locust bean, psyllium, pectin, xanthan, arabic, and combinations thereof.

5. The method of claim 1 wherein the one or more gums is xanthan gum.

6. The method of claim 1, wherein the cooling is performed in a heat exchanger.

7. The method of claim 6, wherein the heat exchanger is a counter-current heat exchanger.

8. The method of claim 1, wherein the fish skin slurry consists of the one or more gums, the water and the natural fish skin.

9. A non-extruded fish analog having a flaky appearance or texture, further having the appearance of fish with skin, produced by the method of claim 1.

10. The method of claim 1, wherein the fish analog does not have a fibrous appearance.

11. The method of claim 1, wherein the creating of the homogeneous dough mixture comprises adding wheat gluten to the one or more proteins, the one or more fats, and the water.

12. The method of claim 1, wherein the natural fish skin is selected from the group consisting of whitefish skin, catfish skin, cod skin, pollock skin, haddock skin, walleye pike skin, trout skin, and combinations thereof.

13. The method of claim 1, wherein the one or more gums are 0.1 to 0.5% of the fish skin slurry by weight, the water is 82 to 86% of the fish skin slurry by weight, and the natural fish skin is 14 to 18% of the fish skin slurry by weight; and the fish skin slurry is 40 to 60% of the combination of the fish analog and the fish skin slurry by weight.

14. The method of claim 1, wherein the final fish analog contains 20% to 24% by weight protein and 5% to 7% by weight fat; and the temperature during the emulsifying of the dough mixture without extrusion is between 143° C. and 149° C., and the pressure during the emulsifying of the dough mixture without extrusion is between 70 psi and 90 psi.

15. The method of claim 1, comprising mincing the natural fish skin to produce fish skin pieces having a size from 1 to 10 mm, and the natural fish skin is mixed with the one or more gums and the water by mixing the fish skin pieces with the one or more gums and the water.

* * * * *